United States Patent [19]

Pollich et al.

[11] Patent Number: 5,026,326
[45] Date of Patent: Jun. 25, 1991

[54] LEVER MECHANISM FOR ADJUSTING PHASE RELATIONSHIP BETWEEN DRIVE WHEELS

[75] Inventors: Gerhard Pollich, Heidelberg; Erwin Unterseher, Stutensee-Büchig, both of Fed. Rep. of Germany

[73] Assignee: Heidelberger Druckmaschinen AG, Heidelberg, Fed. Rep. of Germany

[21] Appl. No.: 534,048

[22] Filed: Jun. 6, 1990

[30] Foreign Application Priority Data

Jun. 8, 1989 [DE] Fed. Rep. of Germany ....... 3918643

[51] Int. Cl.⁵ .............................................. F16H 7/12
[52] U.S. Cl. ................................... 474/134; 474/900; 474/135; 198/813; 198/814; 198/816
[58] Field of Search ....................... 474/134, 135, 900; 271/202; 270/1.1, 18, 52, 58; 101/232, 477, 485, 486, DIG. 48; 198/813, 814, 816

[56] References Cited

U.S. PATENT DOCUMENTS

| | | | |
|---|---|---|---|
| 417,512 | 12/1889 | Rosquist | 474/134 |
| 1,257,660 | 2/1918 | Willis | 474/134 |
| 1,348,130 | 7/1920 | Hevel et al. | 474/134 |
| 2,098,573 | 11/1937 | Dingle | 198/814 |
| 2,425,476 | 8/1947 | Lade et al. | 474/134 |
| 2,639,623 | 5/1953 | Ausherman | 474/134 |
| 2,650,505 | 9/1953 | Vannatta | 474/900 |
| 2,753,812 | 7/1956 | Wharton | 474/134 |
| 3,332,293 | 7/1967 | Austin et al. | 474/134 |
| 3,496,918 | 2/1970 | Finlay | 474/900 |
| 4,128,952 | 12/1978 | Duke et al. | 198/813 |
| 4,376,531 | 3/1983 | Breunig | 271/202 |
| 4,791,869 | 12/1988 | Furukawa | 474/900 |

FOREIGN PATENT DOCUMENTS

| | | |
|---|---|---|
| 510964 | 10/1930 | Fed. Rep. of Germany . |
| 2655102 | 8/1978 | Fed. Rep. of Germany . |
| 975939 | 9/1948 | France .................................. 474/134 |
| 1287753 | 4/1961 | France . |
| 1463988 | 3/1989 | U.S.S.R. ............................... 474/135 |

Primary Examiner—Bruce M. Kisliuk
Assistant Examiner—Roger J. Schoeppel
Attorney, Agent, or Firm—Herbert L. Lerner; Laurence A. Greenberg

[57] ABSTRACT

A device for adjusting a mutual phase relationship of respective rotational angles of two drive wheels, which are mounted on drive shafts parallel to one another and connected by a continuous transmission drive member to one another, the transmission drive member being deflectable so that the drive wheels are angularly set relative to one another, a first spanner being engageable with a slack strand of the transmission drive member, includes an adjusting lever for deflecting the tight strand of the transmission drive member, the adjusting lever being mounted swivellably with respect to a swivelling axis, and carrying the first spanner, and an adjusting device for swivelling the adjusting lever with respect to the swivelling axis and a spreading device including a guiding system for the second spaner, a spinning device for pressing the second spanner against the slack strand of the transmission drive member, and a counter-bearing for the spring device, the spreading device being braced against the adjusting lever by the spring device.

11 Claims, 5 Drawing Sheets

Fig. 6
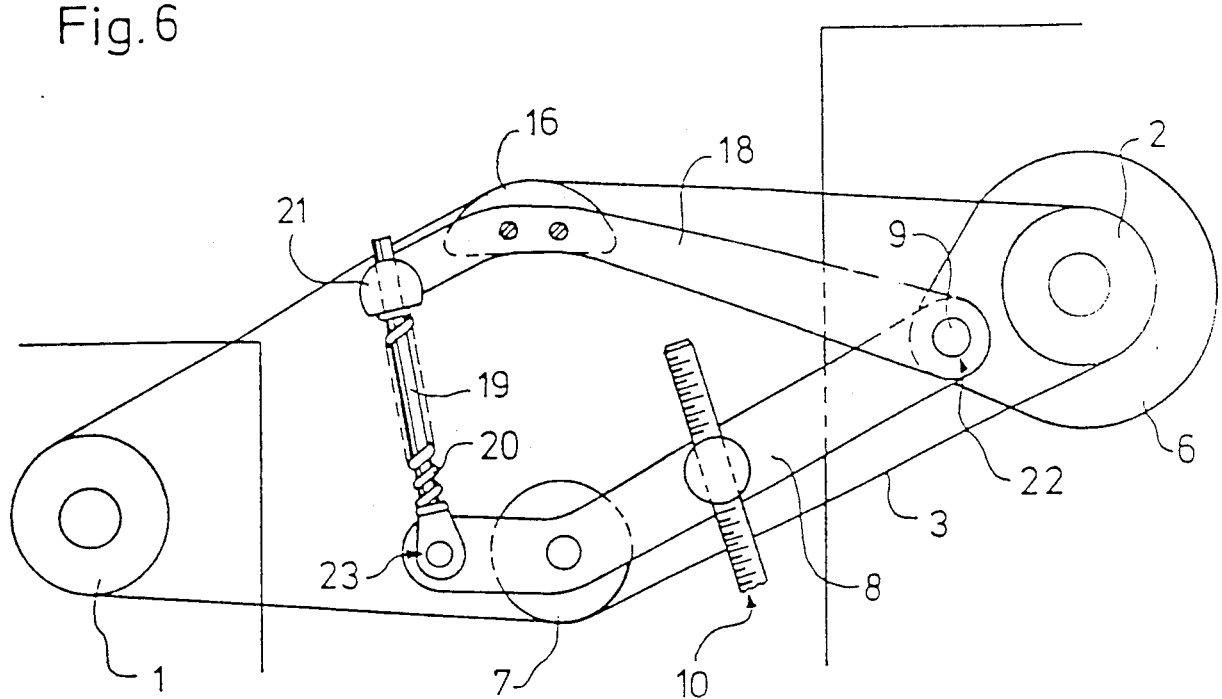
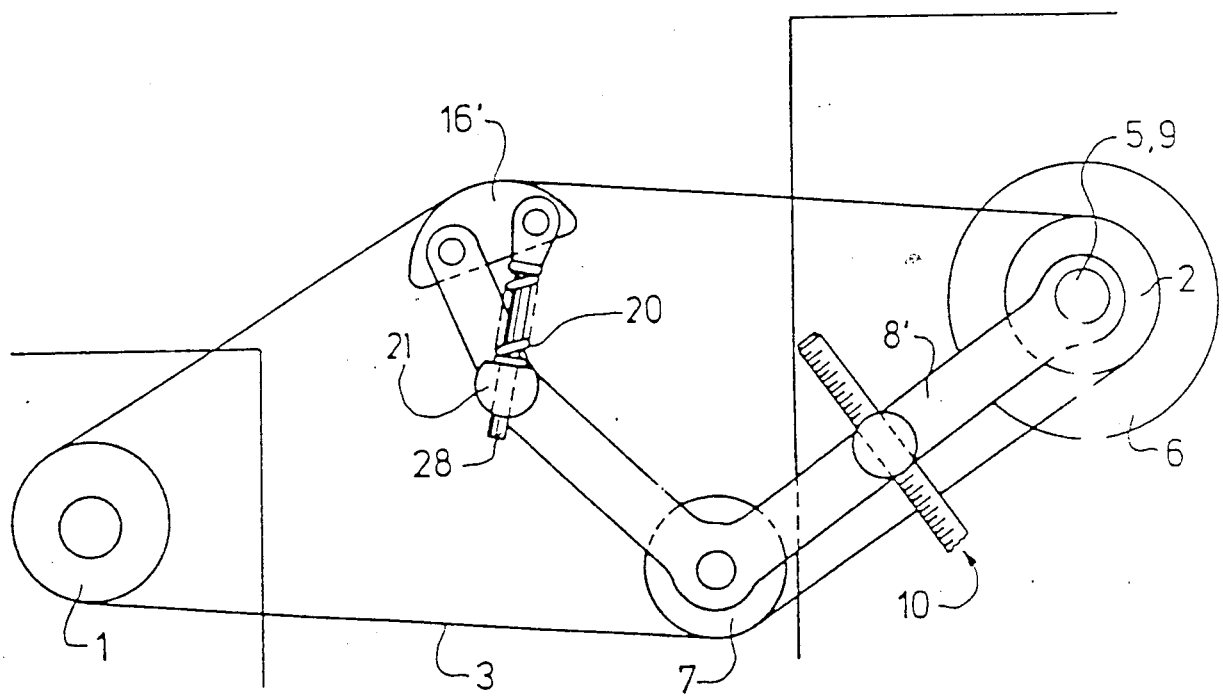
Fig. 7

LEVER MECHANISM FOR ADJUSTING PHASE RELATIONSHIP BETWEEN DRIVE WHEELS

The invention relates to a device for adjusting a mutual phase relationship of respective rotational angles of two drive wheels and, more particularly, of such drive wheels, such as sprockets, which are mounted on drive shafts parallel to one another, and are connected with one another by means of continuous transmission drive means, the transmission drive means being deflectable by adjusting means so that the drive wheels are set against one another, and a first spanner makes contact with a tight strand of the transmission drive means, and a second spanner makes contact with a slack strand of the transmission drive means.

A device of this general type has become known heretofore from German Published Non-Prosecuted Application (DE-A1) 29 03 596. In this regard, the adjusting means have a double-armed lever which is swivellable about a swivelling axis which is fixed in position. Each end of this lever respectively carries a roller or trolley for deflecting a strand respectively of the transmission drive means. The manner in which the deflection occurs is that both the trolley roller assigned to the tight strand of the transmission drive means and the trolley roller assigned to the slack strand are swivelled about the aforementioned swivelling axis through the same angles by means of an adjusting spindle engaging with the lever.

The aforementioned heretofore known device serves for adjusting the phase relationship of a guide shaft in the delivery of a printing machine in relation to the cycle of the sheets which are fed in. The necessity for adjustment of the mutual phase relationship of the rotational angle of two drive wheels also occurs in the drive of the feeder of a printing machine, for example when the printing output, after the setting-up of the compass and/or the register, is increased from a small value to values for a production run with considerably higher machine speed.

An application of the heretofore known device for the aforementioned drive of a feeder, even at the construction stage, would require considerable expenditure for the optimization of the geometry, in order to ensure that when the slack strand of the transmission drive means is constantly tensioned, no impermissible loads occur in the device at specific swivelling positions of the two-armed lever.

No leeway worthy of mention is thereby left for the designer in determining the geometry of the heretofore known device. If there are correspondingly unfavorable spatial conditions, the application of this device can fail due to this fact, or can result in a demand for other measures necessary to enable the transmission drive means to be built-in with an excess length of the slack strand, and the slack strand to be tensioned. Such an additional measure is formed, for example, by assigning an additional sprung tension roller to the slack strand. The feasibility of this measure is, however, once again dependent upon the possibilities afforded by the spatial conditions, and may be excluded, if necessary or desirable.

It is accordingly an object of the invention to provide a device of the foregoing general type with an improvement with regard to the application possibilities for such a device.

With the foregoing and other objects in view, there is provided, in accordance with the invention, a device for adjusting a mutual phase relationship of respective rotational angles of two drive wheels, which are mounted on drive shafts parallel to one another and connected by continuous transmission drive means to one another, the transmission drive means being deflectable so that the drive wheels are angularly set relative to one another, a first spanner being engageable with a slack strand of the transmission drive means, comprising an adjusting lever for deflecting the tight strand of the transmission drive means, the adjusting lever being mounted swivellably with respect to a swivelling axis, and carrying the first spanner, and an adjusting device for swivelling the adjusting lever with respect to the swivelling axis, and spreading means comprising guiding means for the second spanner, a spinning device for pressing the second spanner against the slack strand of the transmission drive means, and a counter-bearing for the spring device, the spreading means being braced against the adjusting lever by the spring device.

From U.S. Pat. No. 4,791,869, resilient spreading means are indeed known, by means of which the slack strand is spreadable away from the tight strand. In this regard, a chain sprocket engageable with the tight strand of a transmission chain and representing a first spanner is mounted on a slide which is guided by means of a frame. The frame basically extends transversely to the tight strand and to the slack strand of the transmission chain, and is basically positioned between these two strands, and thus, in particular, between the two drive sprockets. This, requires suitable possibilities for securing the frame, which are available between the drive sprockets, which, if necessary or desirable, must be provided at considerable construction expense. Such securing possibilities do not have to be created in a device according to the invention, however. The device can thus also be introduced to advantage, in particular, in application cases wherein, for example, no securing possibilities are available for large distances in an intermediate region between the drive shafts of the two drive sprockets.

Thereby, in addition to a leeway in the design when determining the geometry of a device according to the invention, a broad field of application is also open for the introduction of this device.

These advantages are in large measure achieved by providing an adjusting lever which carries the spanner engaging the tight strand, and a spring-loaded spreading means braced against the adjusting lever. Design leeway is produced by the fact that the position of the swivelling axis of the adjusting lever and, thereby, the length of the adjusting lever can be selected within broad limits.

The spring-loaded spreading means furthermore prove advantageous in that, besides intentional changes in length of the tight strand, due to which angular settings of a driven drive wheel with respect to a driving drive wheel may be effected, unintentional changes in length of the slack strand may also be accommodated. Such unintentional slack-strand length changes would otherwise, namely, in the case of rigid mutual assignment of the two spanners, result in the aforedescribed disadvantages, i.e., the occurrence of impermissible loads in the device or the necessity for taking additional measures to compensate for an overlength of the slack strand.

The bracing of the spring-loaded spreading means against the adjusting lever, in accordance with the invention, has a further advantage over a corresponding fixed-position bracing support in that spring elements employed for forming the spring-loaded spreading means only require a relatively small spring path during an adjustment of the mutual phase relationship between a minimum and a maximum value so that, thereby, only relatively small variations in the tension of the transmission drive occur as a result of variable spring forces being exerted by the spreading means.

A further advantage of bracing the spring-loaded spreading means against the adjusting lever is that, in contrast with the aforementioned heretofore known devices with springloaded spreading means, with the exception of a simple adjusting lever swivellable with a conventional adjusting device, no costly guiding means, such as a frame constructed as a slide guide and a slide guided thereon, are required for guiding the first spanner.

The device according to the invention thus combines the advantage that its possible applications are not restricted by problems of rigidity, that relatively great leeway is afforded with respect to its possible designs, and that relatively low manufacturing costs are achievable due to low expenditure for construction.

In accordance with other features of the invention, the guiding means comprise a first driver swivellably mounted by a first articulation, and a second driver forming, with respect to the first driver and the adjusting lever, a coupler having a length variable under the action of the spring device, a second articulation operatively connecting the second driver at one end thereof to the first driver, and the counter-bearing operatively connecting the second driver at the other end thereof to the adjusting lever, the second driver being longitudinally guided in a bore formed in the counter-bearing, the second spanner being carried by one of the first and second drivers.

On the adjusting lever, besides the first spanner and an adjusting device to swivel the adjusting lever with respect to the swivelling axis, it is necessary only to provide bracing means for the spring device of the spreading means. The adjusting device, which is necessary in every case, thereby, together with the adjusting lever, assumes the role of guiding means for the first spanner, so that costly guiding means can be dispensed with for this purpose.

In addition, the guiding means provided for the second spanner are also of relatively simple configuration and, as is explained hereinbelow, permit relatively great leeway with respect to the possible applications of the device according to the invention.

In accordance with a further feature of the invention, the adjusting lever, the first driver and the second driver form a four-element lever train actuable by the adjusting device.

In this regard, the geometry of the lever train can be designed advantageously so that the length of the spring path of the spring device can be minimized between a minimum and a maximum value when the phase relationship is adjusted. An advantageous geometry of this sort results, for example, when that of the four-element lever train begins to approach a parallelogram-type articulation square, wherein the coupler is disposed basically perpendicularly to the connecting line of the axes of rotation of the two drive wheels.

A similar effect is achievable, in accordance with an added feature of the invention, by including at least one bearing plate wherein the drive shaft on which one of the drive wheels is mounted is journaled, and a frame-fixed articulation of the lever train to the one bearing plate.

In a corresponding embodiment according to the invention, the coupler can likewise be disposed basically perpendicularly to the connecting line of the drive shafts of the two drive wheels and, for example, a first articulating connection of the lever train to a bearing plate for one of the drive wheels is provided, and a second articulating connection of the lever train is provided in the immediate vicinity of the other drive wheel or, for example, both articulating connections of the lever train are made to one and the same bearing plate. The last-mentioned embodiment proves to be particularly advantageous if the bearing plate carrying the lever train is positioned adjustably in order, for example, to apply tension to another continuous transmission drive means, which is looped about another drive wheel mounted on the same bearing plate.

A simplification in the construction of the device according to the invention is possible, in accordance with another feature thereof, wherein the adjusting lever is swivellably mounted on one of the drive shafts of one of the two drive wheels.

Another simplification in the construction of the device according to the invention is achieved by including a frame-fixed articulating connection of the lever train to a respective drive shaft of the two drive wheels.

In accordance with another feature of the invention, the drive shaft of one of the drive wheels is used as the swivelling axis for the adjusting lever, and the first articulation for the swivellable mounting of the first driver is formed by the drive shaft of the other drive wheel.

In accordance with yet another feature of the invention, the first articulation is formed by the swivelling axis for the adjusting lever.

In this regard, a drive shaft of one of the drive wheels may be provided as the swivelling axis, and the articulation may be formed with the same drive shaft.

A reduced expenditure for components is achieved, in accordance with yet further features of the invention, wherein the counter-bearing is connected articulatingly to the adjusting lever, and the guiding means for the second spanner are formed of the adjusting lever and a pressure rod, having one end thereof longitudinally guided by the counter-bearing, one end of the adjusting lever facing away from the swivelling axis, and the other end of the pressure rod facing away from the counter-bearing being basically directed towards the slack strand and being respectively connected articulatingly to the second spanner and at a spaced distance from one another.

In this regard, the adjusting lever carrying the first spanner already serves as part of the guiding means for the second spanner. The application possibilities of such a construction are broadened, particularly, in contradistinction with the foregoing embodiments, by the possibility which is afforded for dispensing with one driver and consequently with one articulating connection for the articulation of that driver.

A corresponding construction results particularly advantageously by providing a drive shaft of one of the two drive wheels as a swivelling axis for the adjusting lever. To install the device having such a construction, it is necessary only to provide a connection point for the adjusting device, besides the drive shafts of the two drive wheels which are already present.

In accordance with yet an added feature of the invention offering the same last-mentioned advantages, the counter-bearing is rigidly connected to the adjusting lever, and the guiding means are formed of a pressure rod structure having one end thereof longitudinally guided by the counter-bearing so as to prevent rotation thereof, and having another end thereof directed towards the slack strand and carrying the second spanner.

In addition, such a construction has the advantage that the adjusting lever and the counter-bearing can be formed in one piece, for example as a casting.

In accordance with a preferred embodiment of the invention, the one of the spanners and the two drive wheels are formed as chain sprockets and the transmission drive means are formed as a chain.

In accordance with a concomitant feature of the invention, the at least one of the spanners is formed as a guide shoe for the transmission drive means, the guide shoe being formed with a guiding surface facing towards a strand of the transmission drive means.

Other features which are considered as characteristic for the invention are set forth in the appended claims.

Although the invention is illustrated and described herein as embodied in a device for adjusting a mutual phase relationship of respective rotational angles of two drive wheels, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 6 is a view similar to that of FIG. 1 of a sixth embodiment of the device according to the invention, wherein a swivelling axis for an adjusting lever and a first articulation are positioned co-axially to a swivellable mounting of a first deflector;

FIG. 7 is a view similar to that of FIG. 1 of a seventh embodiment of the device according to the invention, wherein a spanner is coupled to a respective end of an adjusting lever and a pressure rod spring biased against it;

FIG. 10 is a partial cross-sectional view of FIG. 1 taken along the line X—X in the direction of the arrows.

Like parts in the figures are identified by the same reference characters.

Figure 1:
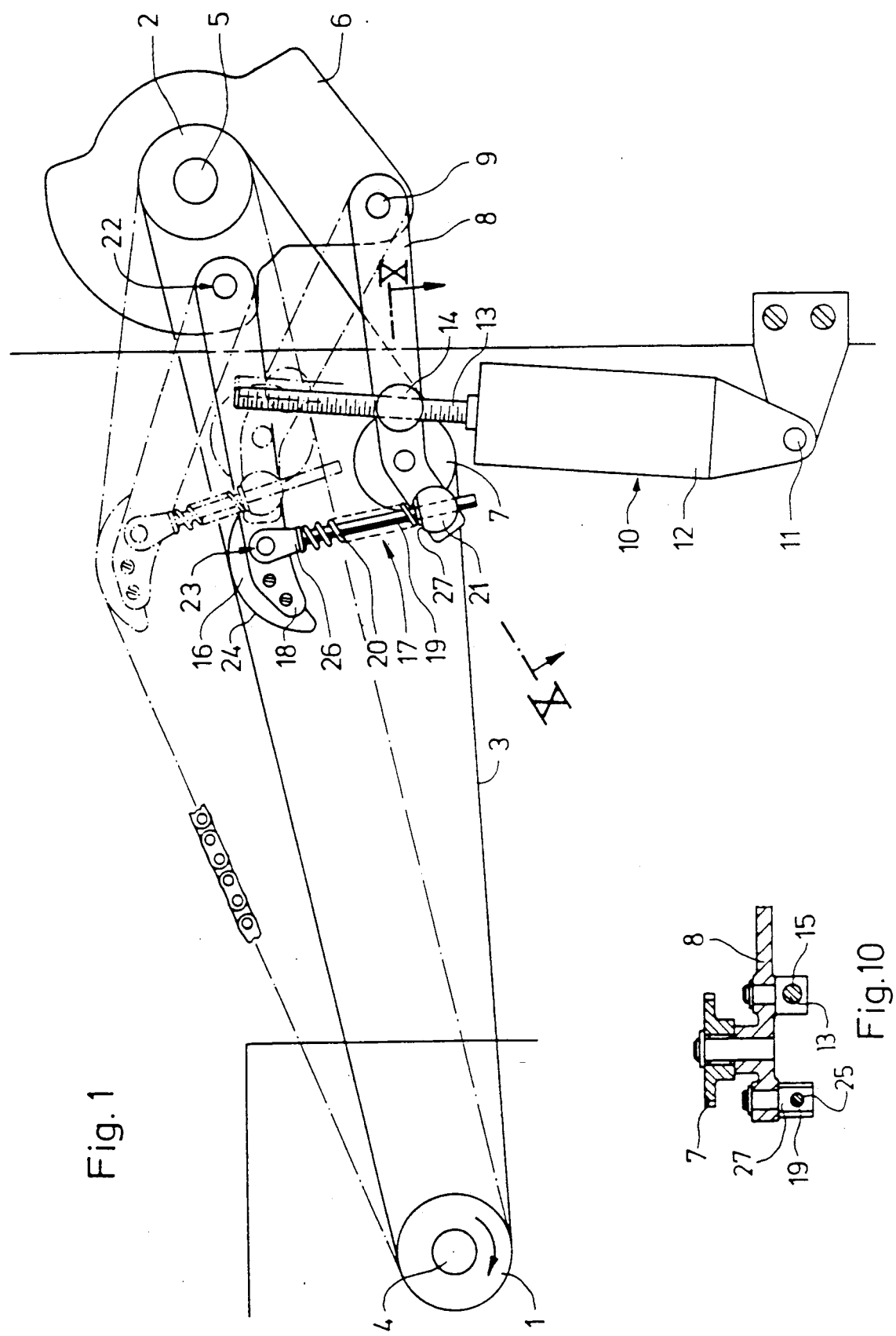
FIG. 1 is a diagrammatic side elevational view of a device according to the invention showing, in phantom, a deflected position and, in solid lines, a non-deflected position of a tight or pulling strand of a transmission drive.

Referring now to the drawing and first, particularly, to FIG. 1 thereof, there are shown therein, for driving a feeder of a printing machine, a driving drive sprocket 1 and a driven drive sprocket 2 connected to one another by means of a continuous transmission drive means 3, the driving drive sprocket 1 being assigned to the printing machine, and the driven drive sprocket 2 being assigned to the feeder. In the embodiment of FIG. 1, a continuous or endless chain is provided as the transmission drive means 3, and the two drive sprockets 1 and 2 are constructed as chain sprockets with a transmission ratio of 1:1. The two drive sprockets 1 and 2 are mounted on respective drive shafts 4 and 5 so as to be fixed against relative rotation therewith. In the preferred embodiment of FIG. 1, the drive shaft 5 for the drive sprocket 2 assigned to the feeder for the printing machine is mounted in an end shield or bearing plate 6 which, in turn, is adjustable with respect to the feeder, so that when an additional drive sprocket is positioned on the drive shaft 5, other transmission drive means looped around the additional drive sprocket can be tensioned thereon.

The transmission drive means 3 has a tight strand looped around the two drive sprockets 1 and 2 which is deflectable by means of a first spanner or tension member 7. The spanner 7 engages the tight strand at the inside thereof, and, in the preferred embodiment of FIG. 1, is constructed as a chain sprocket and is mounted rotatably on an adjusting lever 8. The adjusting lever 8 is, in turn, mounted swivellably with respect to a swivelling axis 9. To swivel the adjusting lever 8 with respect to the swivelling axis 9, an adjusting device, identified in its entirety by reference numeral 10, is provided which, in the preferred embodiment of FIG. 1, has an adjusting motor 12 swivellable around a journal 11, and an adjusting spindle 13 driven by the adjusting motor 12 and engaging in a threaded bore 15 formed in and extending transversely to the longitudinal axis of a bolt 14. The bolt 14, in turn, is mounted so as to be rotatable about its longitudinal axis in the adjusting lever 8, and forms a spindle nut (FIG. 10) cooperating with the adjusting spindle 14, so that a rotation of the adjusting spindle 13 in one and the other rotary direction, respectively, causes a swivelling of the adjusting lever 8 in respective clockwise and counter clockwise directions with respect to the swivelling axis 9.

The slack strand of the transmission drive means 3 is spreadable from the inside thereof away from the tight strand by means of a second spanner or tensioning member 16. For this purpose, spreading means, identified in their entirety by reference numeral 17, are provided. These spreading means 17 are made up of guiding means for the second spanner 16 which, in the preferred embodiment of FIG. 1, are formed of a first link or driver 18 and a second link or driver 19, and a spring device 20 for pressing the second spanner 16 against the slack strand, and a counter-bearing 21 for the spring device 20.

The spreading means 17 are thereby braced against the adjusting lever 8 by means of the spring device 20. Furthermore, the first driver 18 is swivellably mounted by means of a first articulation or joint 22, and the second driver 19 represents, with respect to the first driver 18 and the adjusting lever 8, a coupler having a length which is variable under the action of the spring device 20. For operatively connecting this coupler (the second driver 19) together with the first driver 18 and the adjusting lever 8, a second articulation 23 is provided on one side, and the counter-bearing 21 is provided on the other side.

The second spanner 16 can be carried selectively by either the first driver 18 or the second driver 19. In the preferred embodiment of FIG. 1, the second spanner 16 is secured to the first driver 18 and constructed as a guide shoe for the transmission drive means 3 with a guide surface 24 facing the slack strand. Moreover, the second articulation 23 is provided thereat for effecting an articulating connection of the second driver 19 with the first driver 18, while the counter-bearing 21 is carried by the adjusting lever 8. The counter-bearing 21 is constructed as a swivel bolt with a recess 25 (note FIG. 10) formed therein and extending transversely to the longitudinal axis thereof and matched to the cross-section of the second driver 19, and is mounted swivellably on the adjusting lever 8 (FIG. 10). The second driver 19 is longitudinally guided in the recess 25 and, at one end thereof, carries an articulation head 26 for forming the second articulation 23. The spring device 20 is formed of a helical spring which is braced against the articulation head 26 at one end, and against the counter-bearing 21 at the other end thereof.

Accordingly, the second driver 19 represents a coupler of variable length with respect to the first driver 18 and the adjusting lever 8, the effective length of the coupler being variable under the action of the spring device 20. Consequently, the second spanner 16 follows deflections of the first spanner 7 in a manner that the slack strand of the transmission drive means 3 is constantly spread away from the tight strand.

Furthermore, in the preferred embodiment of FIG. 1, a four-element lever train is formed with the adjusting lever 8, the first driver 18 and the second driver 19, the train being actuable by means of the adjusting device 10. In this regard, the frame of the printing machine is represented by the bearing plate 6.

Figure 2:
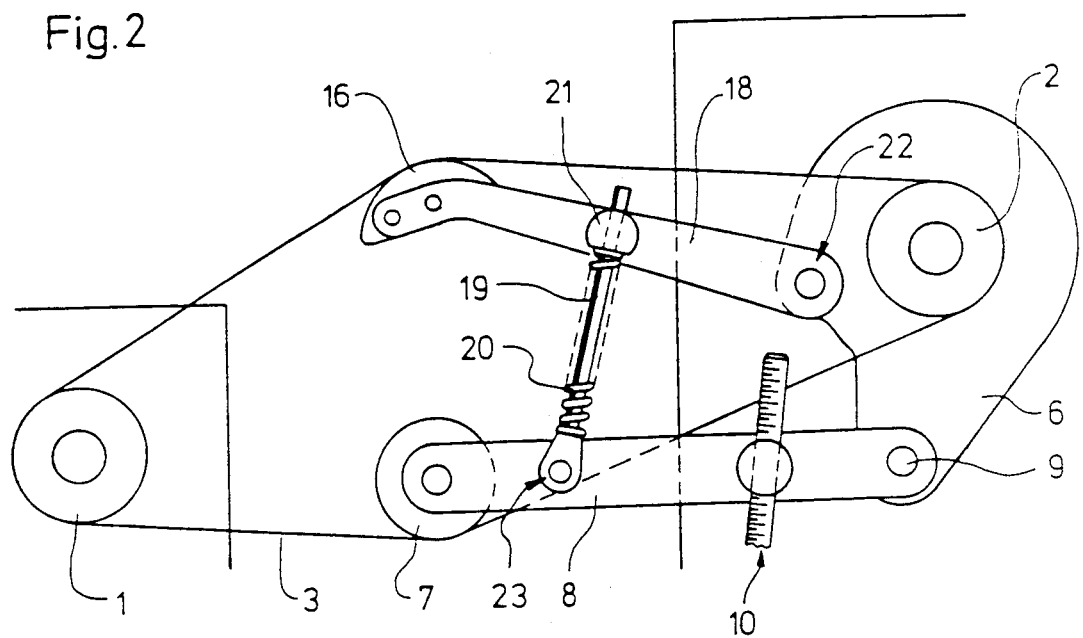
FIG. 2 is a view similar to that of FIG. 1 of another embodiment of the device according to the invention having an alternative articulation of a deflector thereof.

The means for the operative connection of the second driver 19 with the first driver 18, on the one side, and the adjusting lever 8, on the other side, are interchangeable within the scope of the invention. FIG. 2 thus shows a corresponding embodiment. In FIG. 2, the second articulation or joint 23 for the articulating connection of the second driver 19 is provided with the adjusting lever 8, and the counter-bearing 21 for the longitudinally guided articulating connection of the second driver 19 is provided with the first driver 18. In this regard, the counter-bearing is mounted swivellably on the first driver 18.

Figure 3:
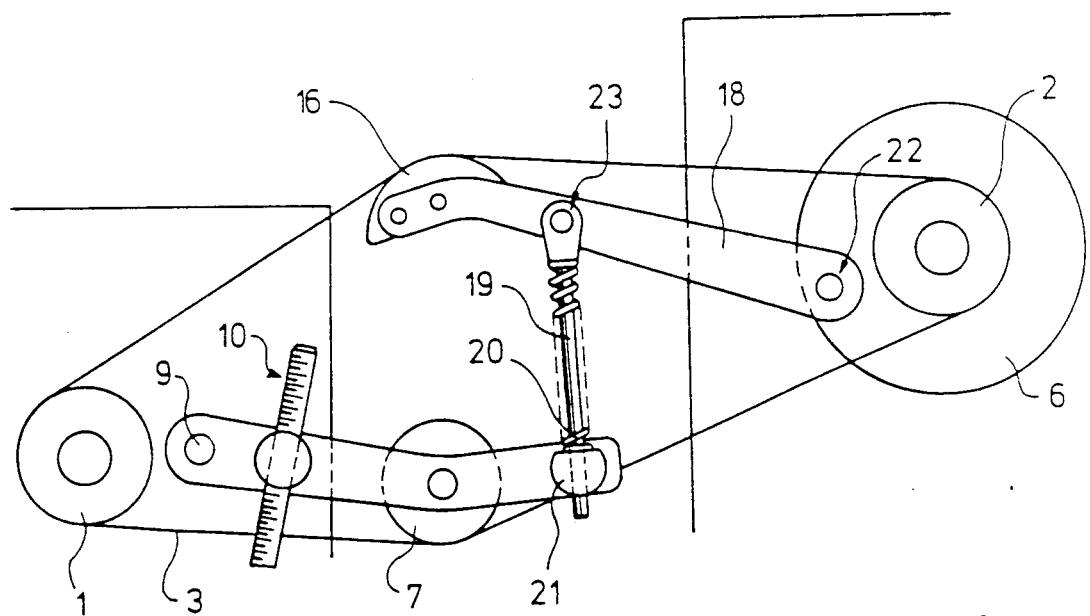
FIG. 3 is a view similar to that of FIG. 1 of a third embodiment of the device according to the invention, wherein a frame-fixed articulation, respectively, of a lever train is provided in close proximity to each one of two drive shafts of the device.

The frame-fixed articulation joint of the four-element lever train formed with the adjusting lever 8 and the first and second drivers 18 and 19 can, furthermore, also be achieved by providing that only one element of the lever train, for example, the first driver 18 (FIG. 3), be coupled to the bearing plate 6, while a second element, namely, the adjusting lever 8 in the embodiment of FIG. 3, for example, is coupled in closer vicinity of the drive shaft 4 for the drive sprocket 1.

Figure 4:
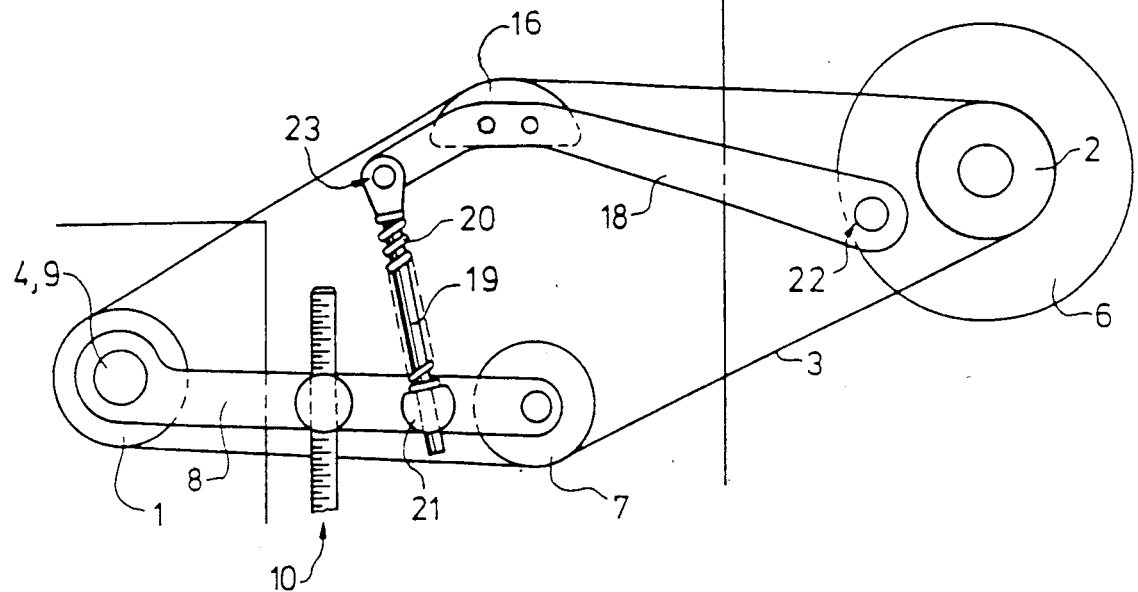
FIG. 4 is a view similar to that of FIG. 1 of a fourth embodiment of the device according to the invention wherein a drive shaft of one of two drive sprockets of the device is provided as a swivelling axis for an adjusting lever.
Figure 5:
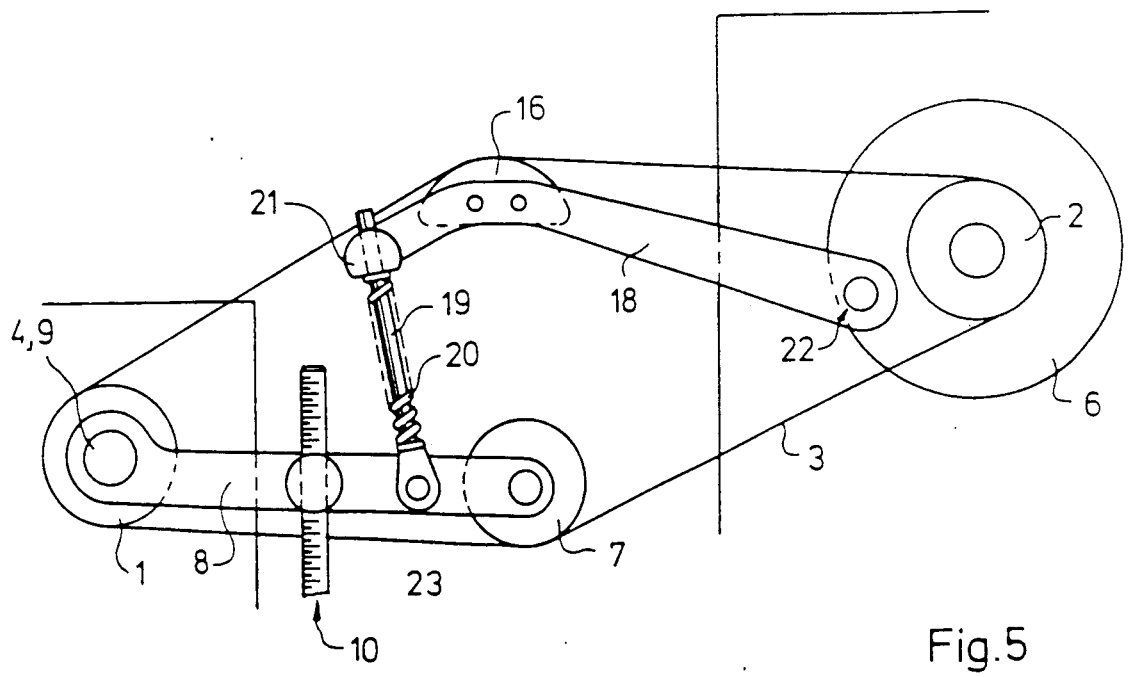
FIG. 5 is a view similar to that of FIG. 1 of a fifth embodiment of the device according to the invention, wherein a frame-fixed articulation of a lever train to one respective drive shaft of two drive sprockets of the device is provided.

In a fourth embodiment of the invention (FIG. 4), the adjusting lever 8 is swivellably mounted on the drive shaft 4 of the drive wheel or sprocket 1. Pursuing this further, both the adjusting lever 8 and the first driver 18 may be swivellably mounted on a respective one of the two drive shafts 4 and 5. A corresponding fifth embodiment, merely with the ends of the second driver 19 reversed, is illustrated in FIG. 5.

In a sixth embodiment of the device according to the invention, the first articulation 22 is formed by the swivelling axis 9 for the adjusting lever 8, as shown in FIG. 6.

As is apparent from FIGS. 1 to 6, the aforedescribed interchanging of the means for operatively connecting the second driver 19 with the first driver 18, on the one side, and with the adjusting lever 8 on the other side, is possible for all of the embodiments of the invention described hereinbefore. In the embodiment of FIG. 6, as also in the further embodiments described hereinafter, the bolt representing the counter-bearing 21 is formed with a flat 27, against which the aforementioned helical spring which is a component of the spring device 20 is braced.

FIG. 7 shows an embodiment of the device according to the invention wherein the guiding means for the second spanner 16' require a considerably lower expenditure. In this regard, the first driver 18 provided in the aforedescribed embodiments can be dispensed with, and the adjusting lever 8' simultaneously assumes the role of guiding means for the second spanner 16'. Indeed, the adjusting lever 8', according to a seventh embodiment described hereinbefore and illustrated in FIG. 7, is mounted swivellably on a drive shaft 5 of the two drive wheels; this does not mean, however, that the embodiment described in greater detail hereinbelow is restricted to this type of articulation of the adjusting lever 8'. Only the swivelling axis of the adjusting lever 8' is represented by the drive shaft 5.

One end of the adjusting lever 8' facing away from this swivelling axis (drive shaft 5) is basically directed towards the slack strand of the transmission drive means 3 and, together with a pressure rod 28, forms the guiding means for the second spanner 16'. The pressure rod 28 is longitudinally guided at one end thereof in the counter-bearing 21 connected articulatingly with the adjusting lever 8' and, at the other end thereof in the counter-bearing 21 connected articulatingly with the adjusting lever 8' and, at the other end thereof facing away from the counter-bearing 21, is likewise directed basically towards the slack strand. The ends of the adjusting lever 8' and the pressure rod 28 directed towards the slack strand are respectively connected articulatingly with the second spanner 16' at a mutually spaced distance. The end of the pressure rod 28 directed towards the slack strand again carries an articulation head 26 and, in accordance with the aforedescribed embodiments, the spring device 20 has a helical spring which is braced on one side thereof against the articulation head 26 and, on the other side thereof, against the counter-bearing 21.

Figure 8:
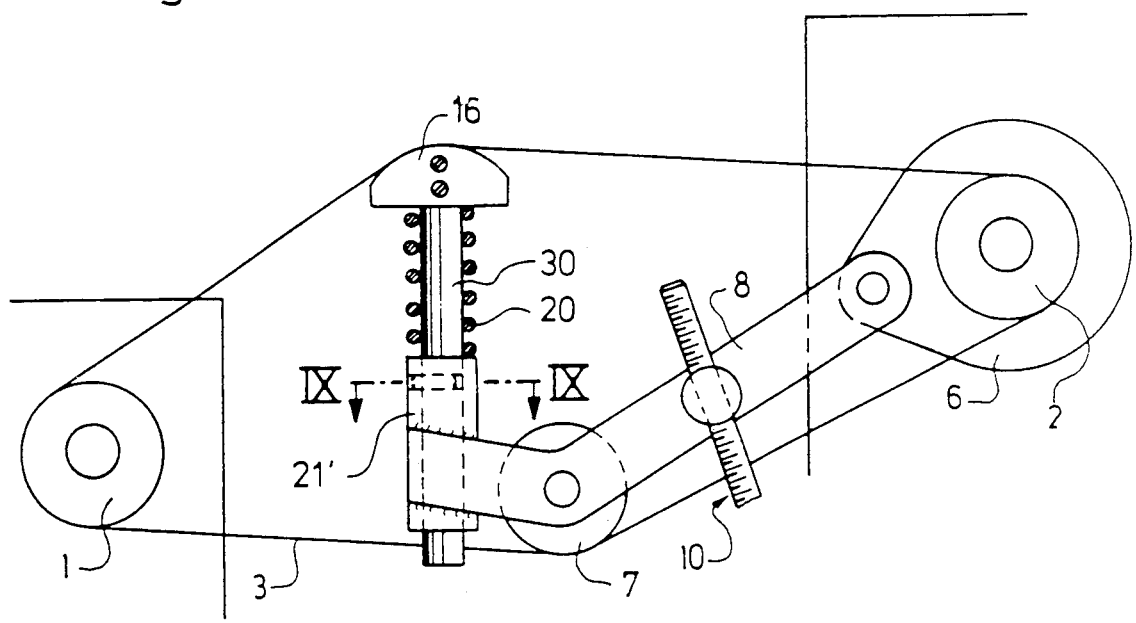
FIG. 8 is a view similar to that of FIG. 1 of an eighth embodiment of the device according to the invention wherein a counter-bearing is rigidly connected to the adjusting lever for guiding a pressure rod assembly carrying a spanner and spring-biased against an adjusting lever.
Figure 9:
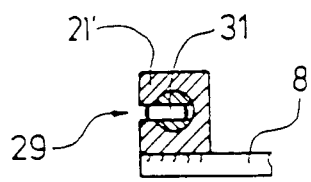
FIG. 9 is a partial cross-sectional view of FIG. 8 taken along line IX—IX in the direction of the arrows.

FIG. 8 represents an eighth embodiment of the device according to the invention, wherein the guiding means for the second spanner 16 require a lower expenditure. In this regard, the first driver 18 provided in the embodiments of the invention described hereinbefore can also be dispensed with. In this case, the counter-bearing 21' is rigidly connected to the adjusting lever 8 and is constructed as a guide bushing formed with a longitudinal slot 29 (note FIG. 9). This rigid connection can, for example, be achieved by welding the guide bushing (counter-bearing 21') to the adjusting lever 8 or by integral formation of the guide bushing with the adjusting lever 8. By means of the guide bushing, one end of the pressure rod structure 30 is longitudinally guided. The other end of this pressure rod structure 30 is directed towards the slack strand and carries the second spanner 16. The spring device 20 is again formed by means of a helical spring which, on one side thereof, is braced against the counter-bearing 21' and, on the other side thereof, against the second spanner 16. The pressure rod structure 30, furthermore, carries a safety bolt 31 (note FIG. 9) which engages in the longitudinal slot 29 and reliably prevents turning or twisting of the pressure rod device 20 and, thereby, of the second spanner 16 which is connected thereto.

The foregoing is a description corresponding in substance to German Application P 39 18 643.1, dated June 8, 1989, the International priority of which is being claimed for the instant application, and which is hereby made part of this application. Any material discrepancies between the foregoing specification and the aforementioned corresponding German application are to be resolved in favor of the latter.

We claim:

1. Device for adjusting a mutual phase relationship of respective rotational angles of two drive wheels, which are mounted on drive shafts parallel to one another and connected by continuous transmission drive means to one another, the transmission drive means being deflectable so that the drive wheels are angularly set relative to one another, a first spanner being engageable with a tight strand of the transmission drive means, and a second spanner being engageable with a slack strand of the transmission drive means, comprising an adjusting lever for deflecting the tight strand of the transmission drive means, said adjusting lever being mounted swivellably with respect to a swivelling axis, and carrying the first spanner, and an adjusting device for swivelling said adjusting lever with respect to said swivelling axis, and spreading means comprising guiding means for the second spanner, a spring device for pressing the second spanner against the slack strand of the transmission drive means, and a counter-bearing for said spring device, said spreading means being braced against the adjusting lever by said spring device.

2. Device according to claim 1, wherein said guiding means comprise a first link swivellably mounted by a first articulation, and a second link forming, with respect to said first link and said adjusting lever, a coupler having a length variable under the action of the spring device, a second articulation operatively connecting said second link at one end thereof to one of said first link, and said counterbearing operatively connecting said second link at the other end thereof to the other of said adjusting lever, said second link being longitudinally guided in a bore formed in said counter-bearing, the second spanner being carried by one of said first and second links.

3. Device according to claim 2, wherein said adjusting lever, said first link and said second link form a four-element lever train actuable by said adjusting device.

4. Device according to claim 3, including at least one bearing plate wherein the drive shaft on which one of the drive wheels is mounted is journaled, and a frame-fixed articulation of said lever train to said one bearing plate.

5. Device according to claim 1, wherein said adjusting lever is swivellably mounted on one of the drive shafts of one of the two drive wheels.

6. Device according to claim 3, including a frame-fixed articulating connection of said lever train to a respective drive shaft of the two drive wheels.

7. Device according to claim 2, wherein said first articulation is formed by said swivelling axis for said adjusting lever.

8. Device according to claim 1, wherein said counter-bearing is connected articulatingly to said adjusting lever, and said guiding means for the second spanner are formed of said adjusting lever and a pressure rod, having one end thereof longitudinally guided by said counter-bearing, one end of said adjusting lever facing away from the swivelling axis, and the other end of said pressure rod facing away from said counter-bearing being basically directed towards the slack strand and being respectively connected articulatingly to the second spanner and at a spaced distance from one another.

9. Device according to claim 1, wherein said counter-bearing is rigidly connected to said adjusting lever, and said guiding means are formed of a pressure rod structure having one end thereof longitudinally guided by the counter-bearing so as to prevent rotation thereof, and having another end thereof directed towards the slack strand and carrying the second spanner.

10. Device according to claim 1, wherein one of the spanners and the two drive wheels are formed as chain sprockets, and the transmission drive means are formed as a chain.

11. Device according to claim 1, wherein at least one of the spanners is formed as a guide shoe for the transmission drive means, said guide shoe being formed with a guiding surface facing towards a strand of the transmission drive means.

* * * * *